J. B. BERGERON.
CHAIN CONNECTOR.
APPLICATION FILED AUG. 24, 1916.
1,237,605.
Patented Aug. 21, 1917.
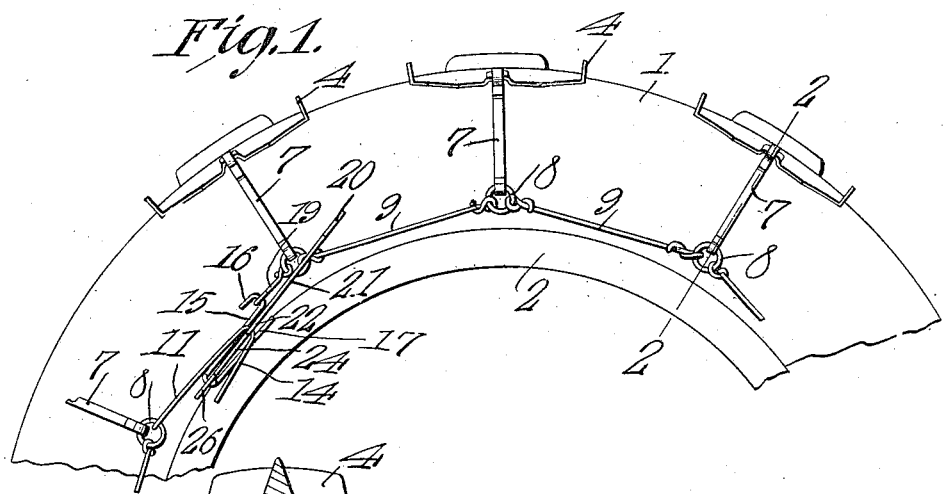
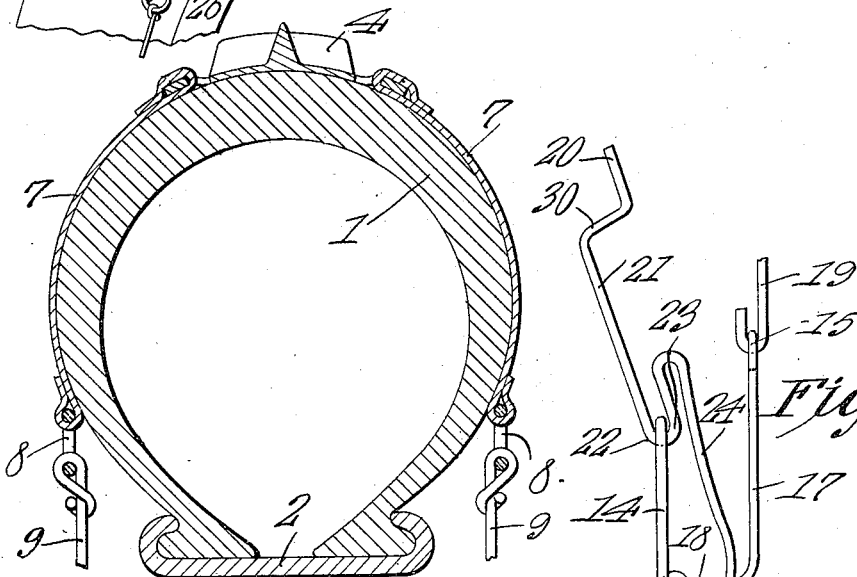
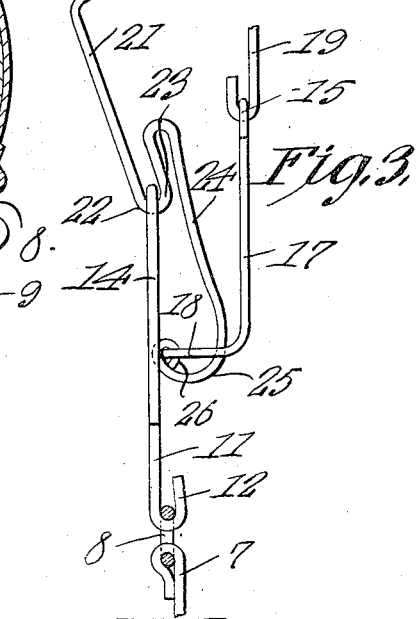
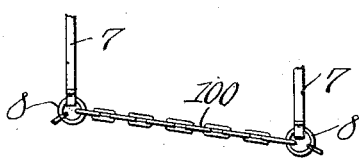
J. B. Bergeron, Inventor
Witnesses
by
Attorneys

UNITED STATES PATENT OFFICE.

JULE B. BERGERON, OF FAIRBURY, NEBRASKA.

CHAIN-CONNECTOR.

1,237,605.  Specification of Letters Patent.  Patented Aug. 21, 1917.

Application filed August 24, 1916. Serial No. 116,695.

*To all whom it may concern:*

Be it known that I, JULE B. BERGERON, a citizen of the United States, residing at Fairbury, in the county of Jefferson and State of Nebraska, have invented a new and useful Chain-Connector, of which the following is a specification.

It is the object of the present invention to provide a chain connector of novel form, the same being adapted peculiarly for use in connection with a tire protector.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a portion of a vehicle tire whereunto the device forming the subject matter of this application has been applied;

Fig. 2 is a cross section taken approximately on the line 2—2 of Fig. 1;

Fig. 3 is a side elevation showing the chain connector, the same being in a slightly open position; and Fig. 4 is a fragmental side elevation showing a slightly modified form of chain wherewith the connector forming the subject matter of this application may be used.

In the drawings there is shown a vehicle tire 1 carried by a rim 2. Mounted on the tire 1 is an antiskidding device including treads 4, rings 8, connected to rods 9 or chains 100, and strips 7 connecting the treads 4 with the rings 8.

The chain connector constituting the subject matter of this application includes a rod 11 provided at one end with a relatively short hook 12 and provided at its other end with a relatively long hook 14. The hooks 12 and 14 lie in planes which are disposed at right angles to each other. The short hook 12 is engaged with one of the rings 8. The numeral 15 indicates a rod having a short hook 16 at one end and a long hook 17 at the other end. These hooks 16 and 17 lie in the same plane, and the bend of the long hook 17 is disposed at right angles to the rod 15 and the bill of the hook 17 to form a U-shaped extension 18. The short hook 16 preferably is engaged with a link 19, pivotally assembled with one of the rings 8 of the side chain. The numeral 20 indicates a lever bent to form an offset loop 21, curved upon itself to form a socket 22 and extended to fashion a U-shaped shoulder 23 which is prolonged to form an extension 24 terminating in an offset arm 25 having an eye 26 engaged with the crown of the part 18. The long hook 14 of the rod 11 is engaged in the socket 22 and the lever 20 is pushed downwardly from the position shown in Fig. 3. Under such circumstances, the part 18 is received between the bill of the long hook 14 and the rod 11, the shoulder 23 passing between the rod 15 and the bill of the long hook 17, it being noted that the offset 30 of the loop 21 permits the extremity of the lever 20 to extend across the adjacent link of the side chain, as shown in Fig. 1, and set down against the tire 1, the construction being such that, when the parts are arranged as above described, an accidental unlocking of the holding means shown in Fig. 3 will not be likely to occur.

Having thus described the invention, what is claimed is:—

A tightening device comprising a rod having a first hook at one end and a second hook at the other end, the hooks lying in the same plane, and the bend of the second hook being disposed at right angles to the rod and the bill of the first hook; a lever bent to form an offset loop, an offset arm, and a U-shaped underlying shoulder between the loop and the arm, the arm being pivoted to the bend of the second hook and being adapted to swing through the second hook; and a pair of tension elements, one of which is engaged with the first hook, the other of which is detachably engaged in the shoulder of the lever.

In testimony that I claim the foregoing as my own, I have hereto affixed my signature in the presence of two witnesses.

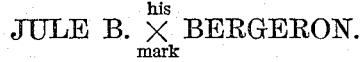
JULE B. X BERGERON.
his mark

Witnesses:
F. L. RAIN,
O. N. GARNSEY.

Copies of this patent may be obtained for five cents each, by addressing the "Commissioner of Patents, Washington, D. C."